United States Patent
Barrett

[15] 3,661,221
[45] May 9, 1972

[54] WEIGHING APPARATUS

[72] Inventor: Edward George Barrett, Witney, England
[73] Assignee: Smiths Industries Limited, London, England
[22] Filed: July 15, 1970
[21] Appl. No.: 54,940

[52] U.S. Cl. ..................177/137, 177/210, 338/145
[51] Int. Cl. ........................G01g 19/08, G01g 3/14
[58] Field of Search..................177/136, 137, 138, 210, 184, 177/187; 338/145

[56] References Cited

UNITED STATES PATENTS

| | | | |
|---|---|---|---|
| 3,092,818 | 6/1963 | Potschka | 177/137 X |
| 3,109,505 | 11/1963 | Davis et al. | 177/137 |
| 3,142,349 | 7/1964 | Blodgett | 177/210 X |
| 3,151,692 | 10/1964 | Dysart | 177/138 |
| 3,167,142 | 1/1965 | Meneely | 177/137 |
| 3,314,491 | 4/1967 | Nelson | 177/138 |

*Primary Examiner*—Richard B. Wilkinson
*Assistant Examiner*—George H. Miller, Jr.
*Attorney*—William D. Hall, Elliott I. Pollock, Fred C. Philpitt, George Vande Sande, Charles F. Steininger and Robert R. Priddy

[57] ABSTRACT

Weighing apparatus incorporated in a vehicle to be responsive to the load on the vehicle's axle(s) and to be used when the vehicle is in motion, which comprises mechanical low pass filtering means to attenuate sudden variations of the relative displacement between the vehicle's load carrying structure and axle(s) at least when the moving vehicle is heavily laden so that only the average value of this varying relative displacement is utilized in giving an indication of the load carried by said structure.

The mechanical low pass filtering means comprises high rate spring means and mechanical damping means that have two closely spaced generally concentric cylindrical surfaces defining an annular gap which contains a silicone substance in fluid or compound form.

11 Claims, 4 Drawing Figures

PATENTED MAY 9 1972 3,661,221

Edward George Barrett
Inventor by Hall, Pollock & Vande Sande

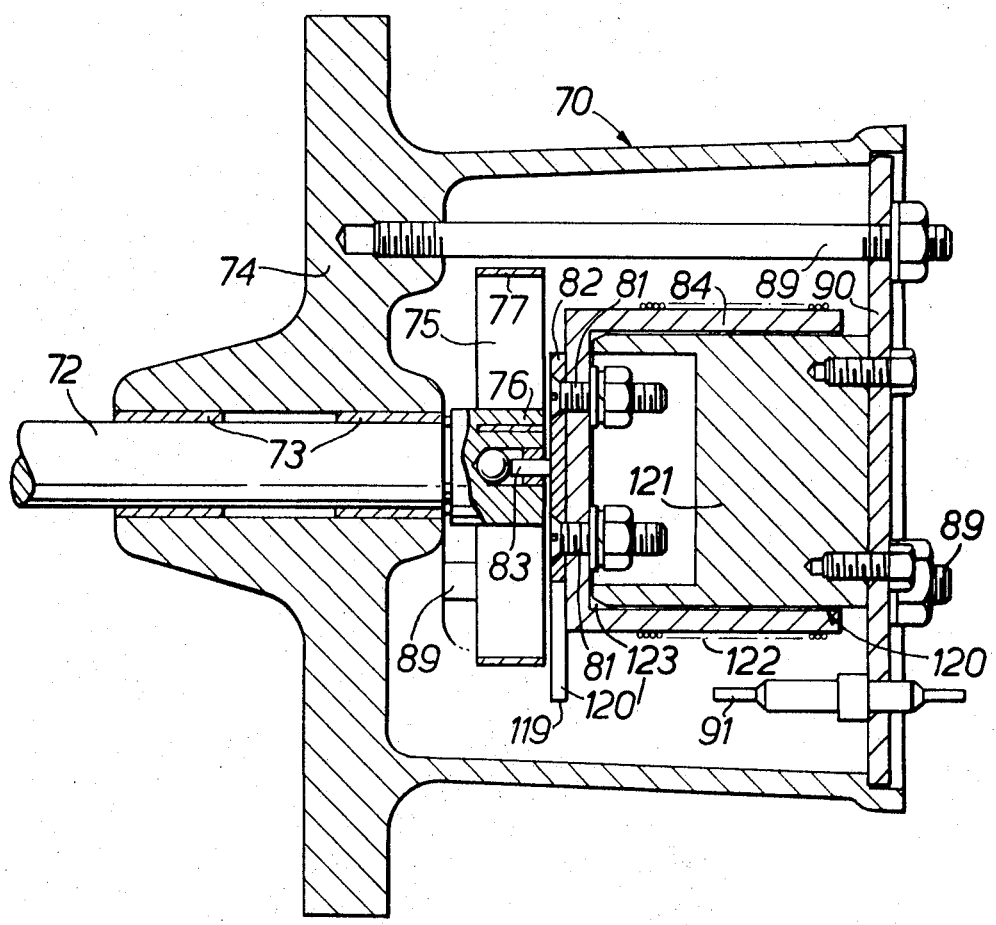

WEIGHING APPARATUS

CROSS REFERENCE TO RELATED APPLICATION

The subject matter of this application is related to that of Bishop U.S. Pat. application Ser. No. 54,939, filed July 15, 1970, for "Weighing Apparatus", and assigned to the same assignee as the instant application.

BACKGROUND OF THE INVENTION

This invention relates to weighing apparatus and in particular to weighing apparatus of the kind adapted or intended to be incorporated in a vehicle so as to be responsive to variations in the load carried by the vehicle.

One type of apparatus of this kind, comprises an electrical indicator (preferably having a pointer co-operating with a scale) and a sensor comprising two relatively movable elements (for example a contact element arranged for wiping engagement of an electrical resistance element to vary the effective electrical resistance of the latter) whose relative movement (hereinafter referred to as the induced relative movement) produces a varying electric signal and is directly related to the relative movement between the load-carrying structure of the vehicle and the road. Generally speaking the relative movement between the load-carrying structure and the road is equivalent to changes in the position of the load-carrying structure relative to the road wheels and/or to the axles of the vehicle, the axles supporting the load-carrying structure through springs whose vertical deflections are related to the total vertical forces acting on the springs.

Prior proposals for this type of apparatus (see for example U.S. Pats. No. 3,109,505; No. 1,147,127; No. 1,621,093; No. 3,167,142; and U.K. Pat. No. 1,018,510) have apparently assumed that the vertical deflections of the springs are at all times directly related to the total load, i.e., to the weight of the load-carrying structure plus the load (if any) carried thereby. The applicant herein has now realized that, at least as concerns certain forms of spring, in particular leaf-springs, this fundamental assumption does not take into consideration the temporary indeterminancy of the settling-position of the springs when the vehicle is stationary, which indeterminancy is believed attributable to the indeterminate variations in striction or friction, in particular between the leaves of leaf springs, and that therefore the indications of load given by the indicators of these prior proposals would be indeterminate and usually inaccurate when obtained with the vehicle stationary.

It will be readily apparent that a single electrical indicator can be used, with suitable circuit switching arrangements, for a plurality of sensors that are each responsive to a proportion of the total vertical forces (hereinafter referred to as the "proportional forces") acting on the springs, the average value of these proportional forces, which are not constant when the vehicle is in motion, being directly related to the proportion of the total load (hereinafter referred to as the "proportional load") producing them. Therefore as used hereinafter, the term "primary relative movement" is intended to mean the effective proportion of the relative movement between the load-carrying structure and the road that produces the induced relative movement between the two elements of one particular sensor.

SUMMARY OF THE INVENTION

It is a primary object of this invention to provide a durable and compact transducer mechanism for vehicle weighing apparatus of the aforesaid kind.

According to this invention there is provided for weighing apparatus to be incorporated in a vehicle having an axle structure, ground engaging wheels mounted on said axle structure, springs acting on said axle structure, and a load-carrying structure supported by said springs for relative movement with respect to ground, and to be utilized when the vehicle is in motion, a transducer mechanism and means for mounting said transducer mechanism to one of said structures in vertical association with said axle structure; wherein said transducer mechanism comprises:

a. an input member,
b. means mounting said input member for angular movement,
c. an operating member to angularly move said input member at least when said relative movement exceeds a predetermined value,
d. a rotation member having a first cylindrical surface and an outer surface,
e. high rate spring means interconnecting said input member and said rotation member and to transmit angular movement of said input member to said rotation member,
f. a support member for said rotation member and having a second cylindrical surface generally concentric with and slightly radially spaced from said first cylindrical surface to provide an annular gap therebetween.
g. a silicone substance in said annular gap to damp relative movement between aid rotation member and said support member,
h. an electrical resistance element coiled about said outer surface,
i. a contact member, and
j. means mounting said contact element for wiping engagement of said electrical resistance element.

Other features of the present invention will be apparent from the appended claims and from the exemplary embodiments now to be described with reference to the accompanying drawings.

BRIEF DESCRIPTION OF THE DRAWINGS

FIG. 2 is a partly cross-sectioned view of the transducer mechanism of FIG. 1 taken longitudinally of the vehicle.

DESCRIPTION OF THE PREFERRED EMBODIMENTS

Figure 1:
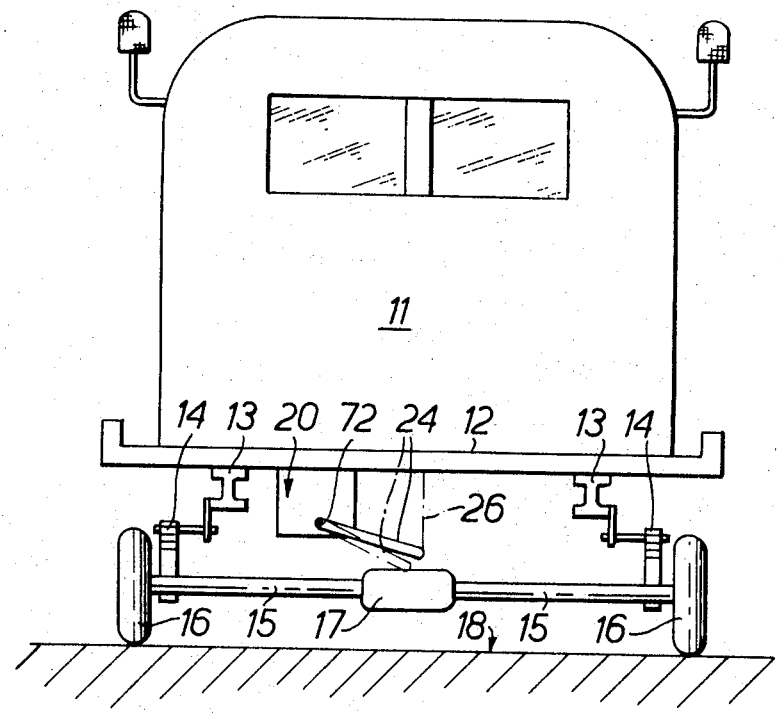
FIG. 1 is a schematic rear view of a truck-like vehicle incorporating a transducer mechanism according to this invention.

Referring to FIG. 1, a truck-like vehicle 10 comprises a cab 11 disposed above the vehicle's front wheels (not shown) and, rearwardly of the cab, a platform 12 and supporting girders 13 extending longitudinally of the vehicle to constitute a load carrying structure. The load carrying structure is supported at the rear by longitudinally directed leaf springs 14 shackled to the vehicle's transversely extending rear axle 15 that drives the rear ground-engaging wheels 16 through a differential gear box 17. The weighing apparatus comprises in the cab 11 an electrical indicator (not shown) having a moving-coil type of movement operating a pointer that co-operates with a scale calibrated in units of weight or in percentages (e.g. 70 to 110 percent) of a maximum desired safety limit for the proportional load, and secured beneath the platform 12 an encased transducer mechanism 20 comprising a sensor and mechanical low pass filtering means (to be described below). An input shaft 72 of the mechanism 20 projects from the mechanism's casing and is fastened to one end of a long lever 24 whose free end (as shown in full lines) is spaced vertically above the differential gear box 17 and is disposed substantially centrally between the wheels 16. In the arrangement shown, the casing is vertically above the rear axle 15 to one side thereof and a cable or chain 26 (represented by a broken line restrains the lever 24 from coming into contact with the differential gear box 17 until the proportional forces in the springs 14 exceed a predetermined value such as to cause the primary relative movement to take up the vertical spacing between the lever's free end and the top of the differential gear box, this position of lever 24 being shown by broken lines. Since the lever 24 is long, large generally vertical displacements of its free end produce corresponding but small angular displacements of the input shaft 72.

Figure 3:
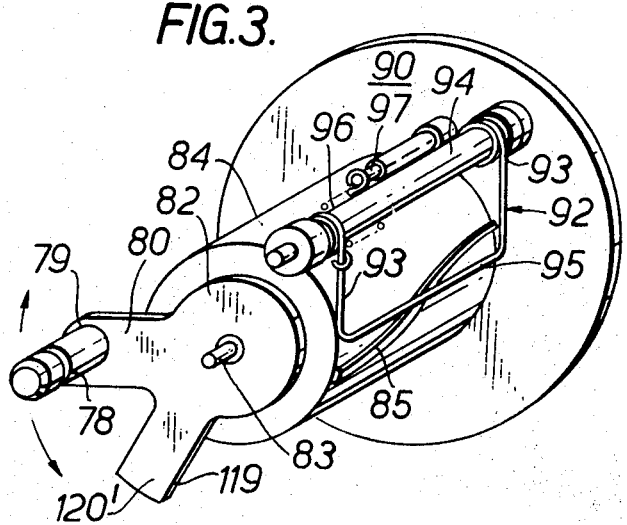
FIG. 3 is a schematic perspective view of part of the transducer mechanism of FIG. 2.

As shown in FIGS. 2 and 3, the casing for the transducer mechanism (indicated by the reference numeral 70) is a cast housing having an end wall 74 in which bearings 73 support for rotation the input shaft 72. The end wall 74 has integral extensions by means of which the housing 70 may be attached to the underside of platform 12. Within the housing 70 a high rate spiral spring 75 has its inner end 76 secured to the inner end of shaft 72 and its outer end 77 secured to an anchor post 78 (FIG. 3) extending longitudinally from the end 79 of a radially projecting arm 80 that is integral with a generally circular plate 82. Plate 82 is secured by bolts or screws 81 to a generally cylindrical hollow drum 84 molded of a suitable plastics material integrally with a projecting bead 85, and rotatably mounted upon a cylindrical support block 121 bolted to a back plate 90 itself secured by long bolts 89 to the housing end wall 74. The bead 85 follows a helical path about the longitudinal axis of drum 84 (and therefore of input shaft 72) and has a small helix angle (i.e. a large pitch) preferably of the order of 20° of arc. An electrically resistive wire 122, constituting one element of a rheostat unit, is closely coiled about the surface of drum 84 so as to have a large number of convolutions each having a small region overlying the bead 85, and has one end electrically connected to a conducting pin 91 projecting through and insulatingly mounted in the back plate 90. The other element of the rheostat is constituted by the base 95 of a U-shaped wire frame 92 whose leg ends 93 are coiled about a mounting post 94 (having an encompassing sleeve of insulating material) mounted between the housing end wall 74 and the back plate 90. A coiled torsional spring 96 surrounds the insulating mounting post 94 and has one end hooked around the frame leg end 93 adjacent plate 82 and its other end secured to a conducting pin 97 insulatingly projecting through and secured to the back plate 90. Spring 96 thus serves both to urge base 95 into constant abutment with the resistive wire regions overlying bead 85, and also to electrically connect the base 95 to the conducting pin 97. It will be appreciated that the point or small area of contact between the frame base 95 and the resistive wire region overlying bead 85 adopts a position longitudinally of cylindrical drum 84 that depends on the angular position of cylindrical drum 84. Since the bead 85 has a small helix angle, a comparatively small change in the said angular position causes a substantial change in the said longitudinal position and consequently a substantial change in the effective resistance of the rheostat.

Mechanical damping means to damp the angular movement of the cylindrical drum 84 is provided by the presence of a silicone fluid or a silicone compound (e.g. that sold in the United Kingdom by Midland Silicones Limited under the Trade Mark "RELEASIL 7") in an annular gap 120 between the outer cylindrical surface of the support block 121 and the inner cylindrical surface of the hollow drum 84. Conveniently the radial dimension of the gap 120 between these two cylindrical surfaces is of the order of six thousandths of an inch. Particularly where a silicone fluid is provided in the annular gap 120 between said two cylindrical surfaces, the external surface of support block 121 is chamfered adjacent its annular end surface nearest plate 82 so as to provide a reservoir space 123 for the silicone fluid, and if desired the end of the gap 120 adjacent the back plate 90 may be closed by an annular sleeve of polytetrafluoroethylene.

In use, when the proportion of the total load affecting the rear axle 15 is increased, the proportional forces thereby induced cause the rear leaf-springs 14 to be depressed so that the load-carrying structure 12 moves nearer the rear axles and the rod 18. As indicated above, transmission of this primary relative movement to the transducer mechanism 20 is only commenced when the vertical separation between the differential gear box 17 and the free end of lever 24 is taken up. Thus an indication of the proportional load will only be obtained from the electrical indicator (connected to the pins 91 and 97 in a circuit including a power supply of the vehicle) when the load is above some predetermined value, preferably near the maximum desired safety limit for this load. It will be appreciated that readings are taken of the electrical indicator while the vehicle is in motion so that the transmitted primary relative movement (equivalent to the vertical depression of the leaf-springs), that produces the induced relative movement between the two elements 95, 122 of the rheostat unit (which induced relative movement gives rise to indicator pointer deflection), is related to the proportional load. However, although the proportional forces are continuously varying because the vehicle is in motion over bumps and pot-holes in the road, the average value of these varying proportional forces is substantially equivalent to the proportional load and it is this average value that causes the two elements 95, 122 of the rheostat unit to take up relative positions which are substantially non-varying for a constant proportional load greater than the predetermined value of proportional load.

In operation, once the vertical separation between the differential gear box 17 and the free end of lever 24 is taken up, the primary relative movement is equivalent to the vertical displacement of the lever's free end (which can move generally vertically because the pivotted lever 24 is longer than this primary relative movement) and is thus proportional to the angular displacement of the input shaft 72. In the steady state (i.e. the theoretical state when the proportional forces transmitted are constant at their average value), the angular displacement of the input shaft 72, and hence the inner end 76 of the high rate spiral spring 75, is equivalent to the angular displacement of the outer end 77 of the high rate spiral spring 75 and is transmitted to the plate 82 (serving as the aforesaid intermediate member) and to the drum 84 secured thereto. The small angular movements of the plate 82 and drum 84 are mechanically damped by the silicone substance in the annular gap 120 whereby under steady-state conditions, the plate 82 and drum 84 take up an angular position directly proportional to the primary relative movement. Since, as explained above, small changes in the angular position of drum 84 result in large changes in the effective resistance of the rheostat unit, the electric indicator connected in an electrical circuit with this effective resistance through conducting pins 91 and 97 may have a high ratio of scale division to unit of proportional load.

In an alternative arrangement, the cable or chain 26 may be omitted so as to enable the free end of lever 24 to continuously abut the top of the differential gear box 17 (i.e. take up the position shown in FIG. 1 by broken lines). In this case, the high rate spiral spring 75 may be assembled in a stressed condition and restrained from moving out of this condition when the primary relative movement is below said predetermined value by the abutment of the end 119 of another radially projecting arm 120' that is integral with plate 82 with stop means (not shown) that are cast integrally with housing 70. Thus the plate 82 will only be moved angularly when the primary relative movement exceeds a predetermined value corresponding to a rotation of input shaft 72 sufficient to unstress spiral spring 75.

It will be readily apparent that by arranging for the rheostat unit to only produce an electrical signal to the indicator when the primary relative movement exceeds a predetermined value, the indicator need only be calibrated so that its minimum scale marking corresponds with the proportional load including said predetermined value of the primary relative movement.

Figure 4:
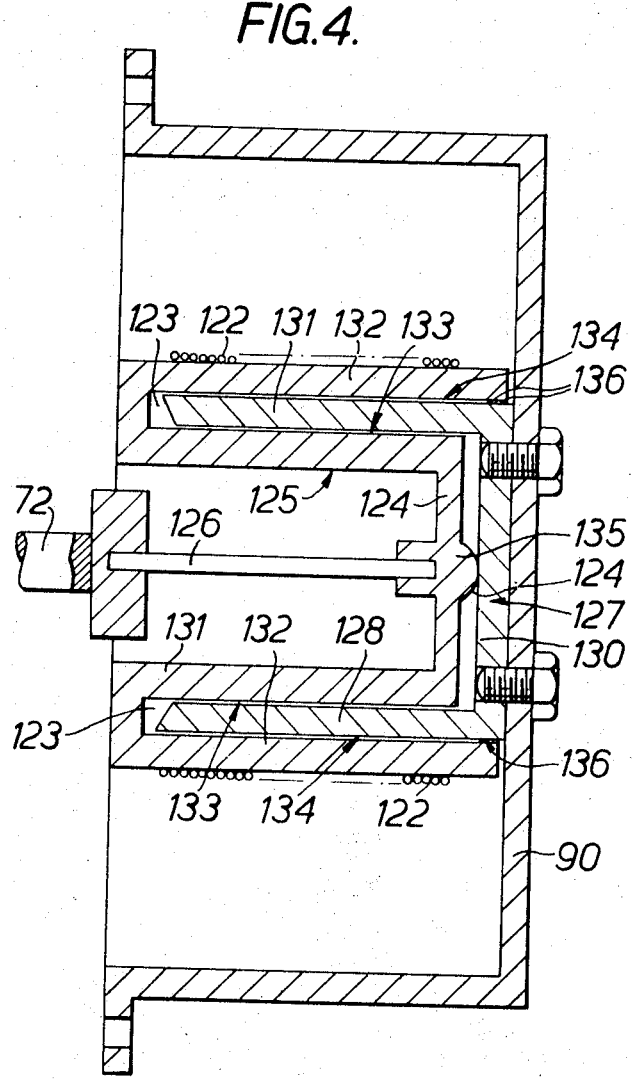
FIG. 4 is a similar view to FIG. 2 showing part of another similar transducer mechanism according to this invention.

In the modification schematically shown in FIG. 4, the plate 82 is omitted and the input shaft 72 is connected to the base 124 of a cup-shaped, double-walled, cylindrical drum 125 (replacing the above-described drum 84) through an elongate resilient flat strip 126 serving as a high rate torsion spring and replacing the above-described spiral spring 75. The support block 121 of FIG. 2 is replaced by a cup-shaped member 127 secured to the back plate 90 that in this arrangement forms the base of a cup-shaped housing replacing the above-described housing 70. The cylindrical wall 128 of cup-shaped member 127 is disposed between the inner and outer cylindrical walls 131 and 132 of the drum 125 with a small annular gap 133, 134 between itself and each of them respectively. The gap 133 (and if desired the gap 134 as well) has a radial dimension of the order of 0.006 inches, and contains a silicone substance (i.e. either a silicone fluid or a silicone compound, e.g., "RELEASIL 7"). The center of the base 130 of cup-shaped member 127 is abutted by a nipple 135 of the drum 125 to provide a pivotal and axially stationary mounting for the drum. As before, the drum 125 is molded of a suitable plastics material integrally with a projecting helical bead (such as the bead 85 of FIG. 3) on the external surface of its wall 132 and is encompassed by the coiled electrically resistive wire 122 constituting one element of the rheostat. If desired, a reservoir space 123 may be provided and a cylindrical sleeve 136 of polytetrafluoroethylene may seal the open end of annular gap 134. In operation of this arrangement, the proportion of the primary relative movement causing input shaft 72 to rotate acts through the high rate torsion spring 126 upon the drum 125 (which serves simultaneously as the aforesaid intermediate member and one component of the mechanical damping means) whose angular displacement is damped by the silicone substance.

It will be appreciated that an alternative disposition to that shown in FIG. 1 for the above-described transducer mechanism 20 may be achieved by securing the casing or housing thereof to the underside of platform 12 centrally of the road wheels 16 above the differential gear box 17 and by replacing the long lever 24 by a vertical rod having a rack at its upper end that is in mesh with a pinion on the input shaft 72. The free lower end of this rod may be vertically spaced from he differential gear box 17 for abutment therewith only when the primary relative movement exceeds said predetermined value, or may be in continuous abutment therewith with the spring means 75 or 126 in the housing being pre-stressed.

It will be apparent that the transducer mechanism may be alternatively mounted on the axle or a part movable therewith with the free end of the lever or rod disposed for contact by the underside of the platform or a part movable therewith, that is to say the above described arrangements may be inverted.

What is claimed is:

1. For weighing apparatus to be incorporated in a vehicle having an axle structure, ground engaging wheels mounted on said axle structure, springs acting on said axle structure, and a load carrying structure supported by said springs for relative movement with respect to ground, and to be utilized when the vehicle is in motion, a transducer mechanism and means for mounting said transducer mechanism to one of said structures in vertical association with said axle structure; wherein said transducer mechanism comprises:
   a. an input member,
   b. means mounting said input member for angular movement,
   c. an operating member to angularly move said input member at least when said relative movement exceeds a predetermined value,
   d. a rotation member having a first cylindrical surface and an outer surface,
   e. high rate spring means interconnecting said input member and said rotation member and to transmit angular movement of said input member to said rotation member,
   f. a support member for said rotation member and having a second cylindrical surface generally concentric with and slightly radially spaced from said first cylindrical surface to provide an annular gap there-between,
   g. a silicone substance in said annular gap to damp relative movement between said rotation member and said support member,
   h. an electrical resistance element coiled about said outer surface,
   i. a contact element, and
   j. means mounting said contact element for wiping engagement of said electrical resistance element.

2. A transducer mechanism according to claim 1, wherein said silicone substance is a silicone compound.

3. A transducer mechanism according to claim 1, herein said high rate spring means comprises a spiral spring.

4. A transducer mechanism according to claim 1, wherein said high rate spring means comprises a flat strip torsion spring.

5. A transducer mechanism according to claim 1, wherein said outer surface is generally cylindrical and is provided externally with a rib that follows a helical path of small helix angle about an axis of the generally cylindrical outer surface; and wherein said contact element comprises an elongate portion extending longitudinally of said generally cylindrical outer surface in wiping contact with said electrical resistance element above said rib.

6. A transducer mechanism according to claim 5, wherein said small helix angle is of the order of 20° of arc.

7. A transducer mechanism according to claim 1, wherein said rotation member comprises a generally annular wall having an internal surface and an external surface, said external surface constituting the aforesaid outer surface.

8. A transducer mechanism according to claim 7, wherein said internal surface constitutes the aforesaid first cylindrical surface.

9. A transducer mechanism according to claim 7, wherein said rotation member comprises another generally annular wall disposed concentrically within and in radially spaced relation to the first-mentioned annular wall and having an external surface facing the internal surface of the first-mentioned annular wall; and wherein said support member comprises an annular wall having an external surface and an internal surface that constitutes the aforesaid second cylindrical surface, said annular wall of the support member being disposed generally concentrically between the annular walls of said rotation member.

10. For weighing apparatus to be incorporated in a vehicle having an axle structure, ground engaging wheels mounted on said axle structure, springs acting on said axle structure, and a load-carrying structure supported by said springs for relative movement with respect to ground, and to be utilized when the vehicle is in motion, an electrical transducer to respond to movement between said two structures in accordance with weight imposed on said load-carrying structure, comprising a first member having an outwardly-facing cylindrical surface; a second member having an inwardly-facing cylindrical surface of larger diameter than said outwardly-facing cylindrical surface; means for coupling the two members to the said two structures respectively for angular displacement relative to one another in accordance with said movement, said coupling means including means mounting the two members with the said surfaces co-axial with one another to define an annular gap between the two members; damping means comprising a viscous substance in said gap to damp said relative angular displacement between the two members; and an electrical pick-off for providing a measure of said weight, said pick-off being responsive to said relative angular displacement between the two members to provide an electrical signal in accordance with said relative angular displacement.

11. An electrical transducer according to claim 10, wherein said electrical pick-off comprises a resistance element carried with one of said members, and a contact element for establishing electrical connection with a point of said resistance element, the particular point at which contact is made being dependent on the relative positions of said resistance and contact elements; and wherein there is provided means mounting said contact element with respect to the other of said members to make contact with said resistance element at a location whose position is dependent on said angular displacement.

* * * * *